United States Patent [19]

Lipman

[11] Patent Number: 4,827,245
[45] Date of Patent: May 2, 1989

[54] PORTABLE STROBE LIGHT SYSTEM

[75] Inventor: Leonard H. Lipman, Humble, Tex.

[73] Assignee: Falcor Group Inc.

[21] Appl. No.: 159,227

[22] Filed: Feb. 23, 1988

[51] Int. Cl.⁴ .............................................. B60Q 7/00
[52] U.S. Cl. ................................ 340/321; 340/908.1;
340/473; 340/478; 362/285
[58] Field of Search .......... 340/908, 81 R, 82, 114 R,
340/114 B, 321, 119, 139, 146; 362/285

[56] References Cited

U.S. PATENT DOCUMENTS

| | | | |
|---|---|---|---|
| 3,539,986 | 11/1970 | Crawford | 340/321 X |
| 3,925,704 | 12/1975 | Camic | 340/82 X |
| 3,959,768 | 5/1976 | Mayo | 340/82 |
| 4,447,802 | 5/1984 | Böse | 340/119 |
| 4,489,306 | 12/1984 | Scolari | 340/114 B |

Primary Examiner—Joseph A. Orsino
Assistant Examiner—Brian R. Tumm
Attorney, Agent, or Firm—James L. Jackson

[57] ABSTRACT

A portable multilight system is provided for traffic control, highway safety and to identify obstructions. A housing having a rechargeable power pack disposed therein includes a plurality of light blocks that are movable from a stored position within the housing to an extended position when developed to form an elongated spaced light block array. Each of the light blocks incorporates at least one Xenon tube stroke light with appropriate electrical connections and switching apparatus to permit selection of simultaneous flashing of the strobe light or serial flashing of the strobe lights from either end of the light block array. Flashing of the strobe lights can also be controlled from the standpoint of flash interval. The strobe light array can be used in many different arrangements for all types of traffic control, for identification of emergency helicopter landing sites and for identifying obstructions.

16 Claims, 3 Drawing Sheets

FIG. 1
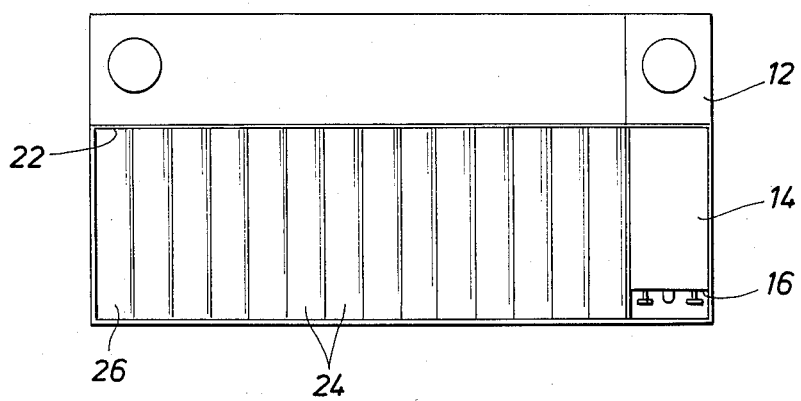
FIG. 2
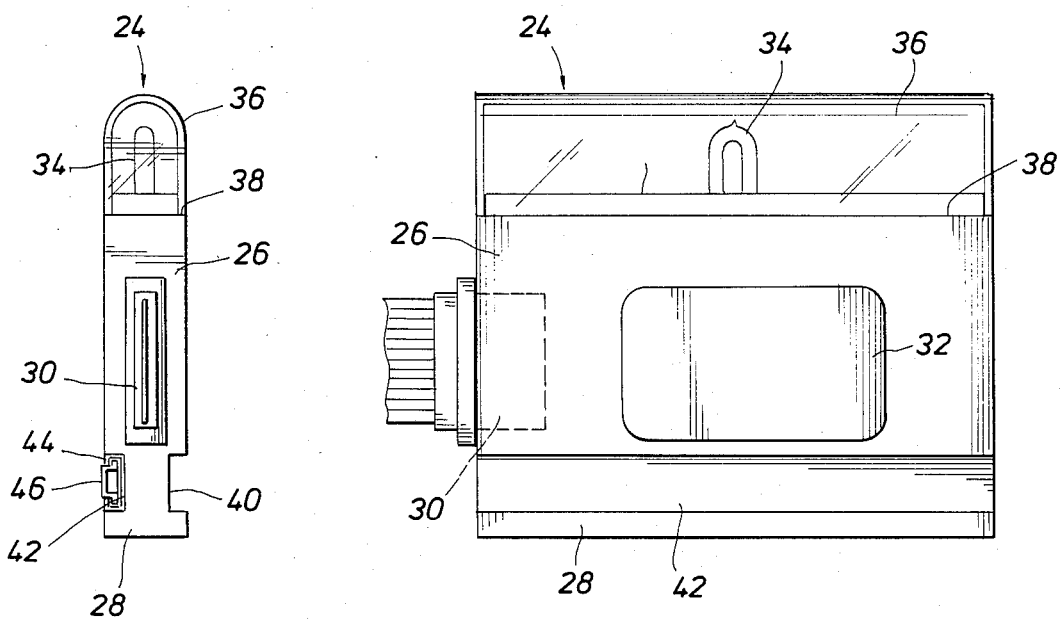
FIG. 3
FIG. 4
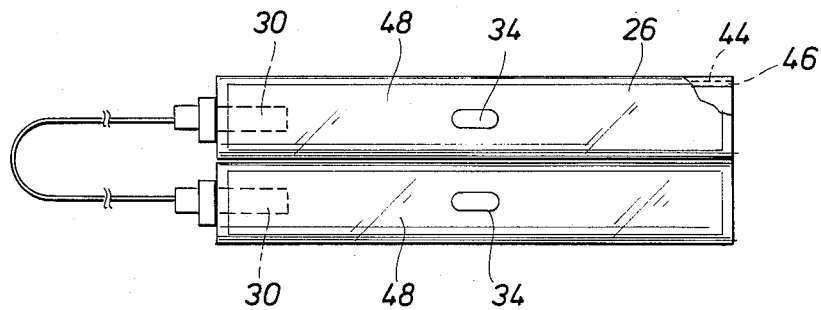

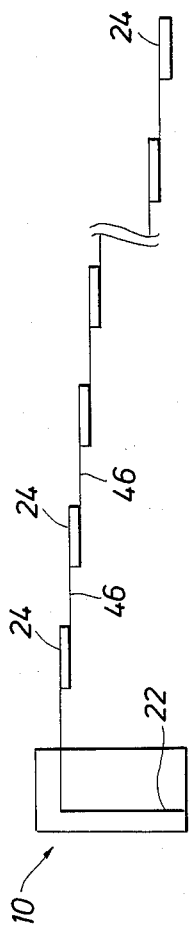
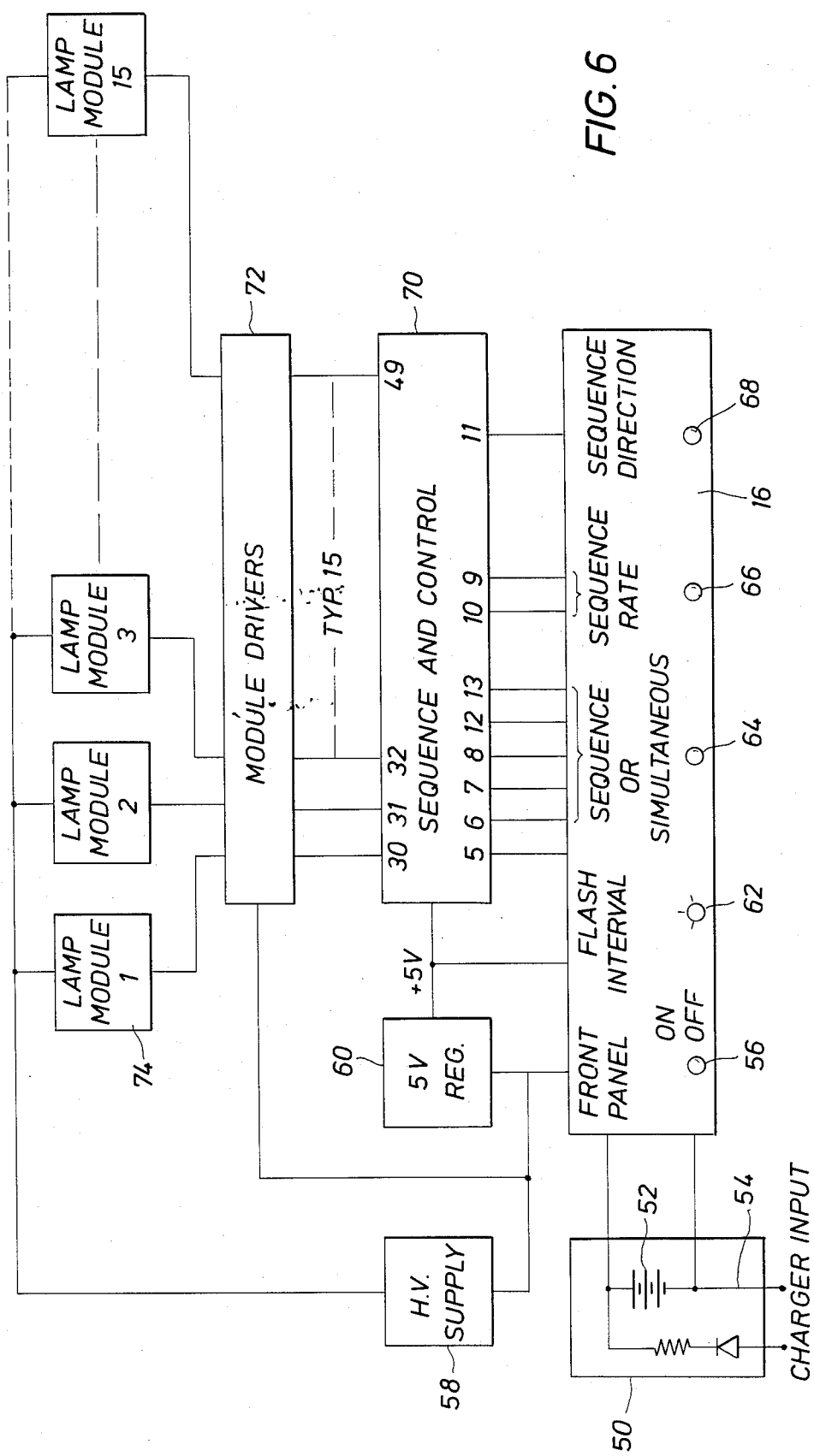
FIG. 5
FIG. 6

PORTABLE STROBE LIGHT SYSTEM

FIELD OF THE INVENTION

This invention relates generally to strobe light systems such as are employed as warning lights on highways for traffic control or for identifying obstructions that present danger to motorists. More particularly, the present invention is directed to a portable strobe light system which is easily transportable in a small enclosure and can be simply and efficiently withdrawn from the enclosure to form an elongated multilight strobe light array that can be selectively activated for directional traffic control and for making specific objects and areas visible.

BACKGROUND OF THE INVENTION

Most police vehicles, security vehicles, and medical emergency vehicles are provided with various lighting devices and roadway markers for effecting directional control of traffic when a roadway emergency arises. These safety devices typically are in the form of highly visible reflective markers that are made easily visible by the reflection of the light from the headlamps of typical automotive vehicles. Such emergency vehicles are also typically provided with one or more flashlights that are used by official personnel as needed. Such flashlights can be employed for directing traffic, but typically require the employment of personnel for directional control of traffic. Other emergency traffic lighting may be provided by flares, such as bright red emergency marker flares. Marker flares will typically burn only for a period of from 10 to 15 minutes and must be replaced if traffic control is to be extended for any significant period of time. Obviously, with flares and other such marker lighting systems, the directional control of highway traffic is difficult to maintain. For this reason, highway emergency flares are typically utilized in conjunction with traffic control officers to ensure that effective traffic control is being maintained under emergency conditions. It is desirable, therefore, to provide an emergency warning light system that is readily visible to automotive vehicle drivers and which has the capability of accomplishing directional control of traffic as well without necessitating continuous control by traffic control officers.

In and around large cities, various emergency medical support (EMS) vehicles are provided such as ambulances, helicopters, etc. In order to guide EMS helicopters to the site of an emergency, especially during darkness or poor lighting conditions, various lights, such as flashlights, emergency flares, etc., are utilized to outline a landing area. As mentioned above, a number of officers or other personnel must be present to identify and secure the helicopter landing area in the event flashlights are employed. Also, in the event highly visible flares are employed to outline the helicopter landing area, these flares must be continuously replaced as they burn out so that the approaching helicopter can identify the landing area and make a safe descent to the landing zone. It is desirable to provide a warning light system having the capability of efficiently outlining a landing zone for EMS helicopters, wherein the light system is operative for a substantial period of time without requiring continuous attention by emergency personnel.

In the trucking industry and for private automobiles, is desired to provide an emergency lighting system that renders disabled trucks and automobiles highly visible even under conditions of poor light. Moreover, it is also desirable to provide a emergency light system that is completely portable and can be set up in a short period of time to ensure that oncoming traffic is directed around the disabled vehicle and any personnel that might be located near the disabled vehicle.

SUMMARY OF THE INVENTION

It is therefore a principal feature of the present invention to provide a novel strobe light warning system that may be effectively utilized as a highway warning device, as a directional control for routing traffic past an obstruction, a disabled vehicle, etc., and which also finds effective use to outline landing areas for EMS helicopters and the like.

It is a feature of this invention to provide a novel highway warning light system that is capable of being effectively stored in a small container and which incorporates a plurality of safety lights that are capable of being withdrawn in series from the container to provide an elongated multiple light display that is readily visible under all light conditions.

It is an even further feature of this invention to provide a novel light warning system incorporating multiple lights each being in the form of Xenon tube strobe lights and incorporating electrical circuitry to fire the same in a sweeping light pattern of selected direction for directional control of traffic or to fire the same simultaneously to identify an obstruction that must be avoided.

It is an even further feature of this invention to provide a novel portable multilight strobe light display which incorporates self-contained circuitry and a rechargeable battery for power to thus enable the strobe light system to be quickly and efficiently positioned and put in use when an emergency arises.

Briefly, a storage case or container is provided which is approximately the size of a small suitcase and therefore can be readily stored in most vehicles. The storage case defines a compartment which contains the solid state switching circuitry and battery pack of the warning light system. The storage case also defines a receptacle forming a storage compartment for the multiple strobe light array when the light system is not in use. The switching circuit located inside the case is of solid state design for reliability and low current drain. The purpose of the circuitry is to fire the Xenon strobe lights in a sequential pattern which clearly identifies traffic directions to oncoming vehicles. The effect will be a sweeping of the light pattern which can be changed from right to left or reversed as needed for traffic control. Additional controls of the switching circuit can also cause flashing of all of the lights simultaneously, such as when the light warning system is employed in a road block situation. An LED display is utilized to indicate the condition of the battery pack. A set of cables is stored in the case and can be used to supply electricity to charge the battery of the battery pack from an automotive vehicle battery should the self-contained rechargeable battery pack become discharged through prolonged use. Alternatively, the circuitry of the multilight safety system may be powered directly by the 12 volt electrical system of an automatic vehicle.

The power supply of the battery pack can be provided by a nicad battery pack or the "gel-cell" type of rechargeable power supply as desired. This type of electrical system allows complete portability with an operative light of from two to four hours before recharging of the battery is necessary. The battery pack can either be changed out with a fresh unit or can be recharged using a 12 volt DC or 110 volt AC charging system. Other types of batteries may also be employed within the spirit and scope of the present invention to provide a power supply that will permit the warning light system to be operative for more extended periods of time.

The strobe light array consists of a plurality of light units, each being provided with a Xenon tube strobe light. Each light device is typically in the form of an ABS plastic unit having a weighted face to allow for stability. At the upper portion of each light unit or light block is located a Xenon strobe which is covered with a replaceable lens cap. This feature allows quick repair if damaged and also provides the ability to change the color of the lights if desired. The light units are probably connected to each other by a telescoping track system that enables the light units to be withdrawn from the case to form a spaced light array many feet in length. The light units may also be connected to one another by means of a prefolded plastic fence which is approximately eight to ten inches in height. Both front and back surfaces of the prefolded fence and the light units are covered with striped reflective tape which increases visibility of the units even when the strobe light display is inactive. The wiring for the strobe lights is carried in molded tubes on the top and bottom of the fence structure or provided by wire ribbons connected by electrical plugs to the various light units. The light units are grooved to receive the fences which establishes electrical contact when connected together. The light array will have 14 or so strobe light units interconnected by fence structures in the order of 16 inches in length. When not in use, these fences and strobe light units fold into a small enough package to fit into the carrying case. The last light unit of the light array serves as the door or end panel of the case. When deployed the warning light display will be almost 20 feet in length, thereby allowing a single warning light unit to provide effective protection for most accident scenes.

The strobe light system of the present invention provides effective protection under circumstances where fuel vapors or other hazardous or explosive materials are located at the site of an emergency condition. This multiple strobe light system is highly visible in all weather and light condition. Since it is so easy to secure the accident scene, this emergency light system allows police and other emergency personnel to render effective assistance to the victims in less time with few personnel. The sweeping light pattern established by the sequential firing of the strobe lights helps direct traffic in the direction of the sweep. Conventional flares only define the wreck scene, while the present invention also actively directs traffic around the obstructions. Since the direction of light flashing sweep can be reversed, it is not critical where the carrying case is situated. Additionally, all of the lights can be caused to flash simultaneously if desired, thereby creating a road block if such is desired.

The lens caps of the various strobe lights may be appropriately changed if different light colors are called for. If the emergency lighting system is utilized to outline a helicopter pad for EMS helicopters, the last two lights could be changed to a blue color by using the blue lenses to thus orient the helicopter landing area with respect to wind direction. This would allow a safe landing zone for the aircraft with minimal confusing directions from ground personnel. Flashing light units of several lengths and sizes may be employed; however the multilight system described above would be utilized by police, fire, EMS, and military activities. A smaller, less sophisticated multilight system may be employed for private vehicles or may be attached to wide loads to alert following traffic and direct the vehicles around the oversized load.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a plan view of a warning light system constructed in accordance with the present invention.

FIG. 2 is a side elevational view of one of the light blocks shown in FIG. 1.

FIG. 3 is an end view of the light block of FIG. 2.

FIG. 4 is a plan view of two light blocks shown to be positioned in side-by-side relation.

FIG. 5 is a plan view showing the warning light system in its expanded deployed condition.

FIG. 6 is a block diagram type electrical circuit illustrating the power and control system for the multiple lamp modules of the warning light system of this invention.

DETAILED DESCRIPTION OF PREFERRED EMBODIMENT

Figure 7:
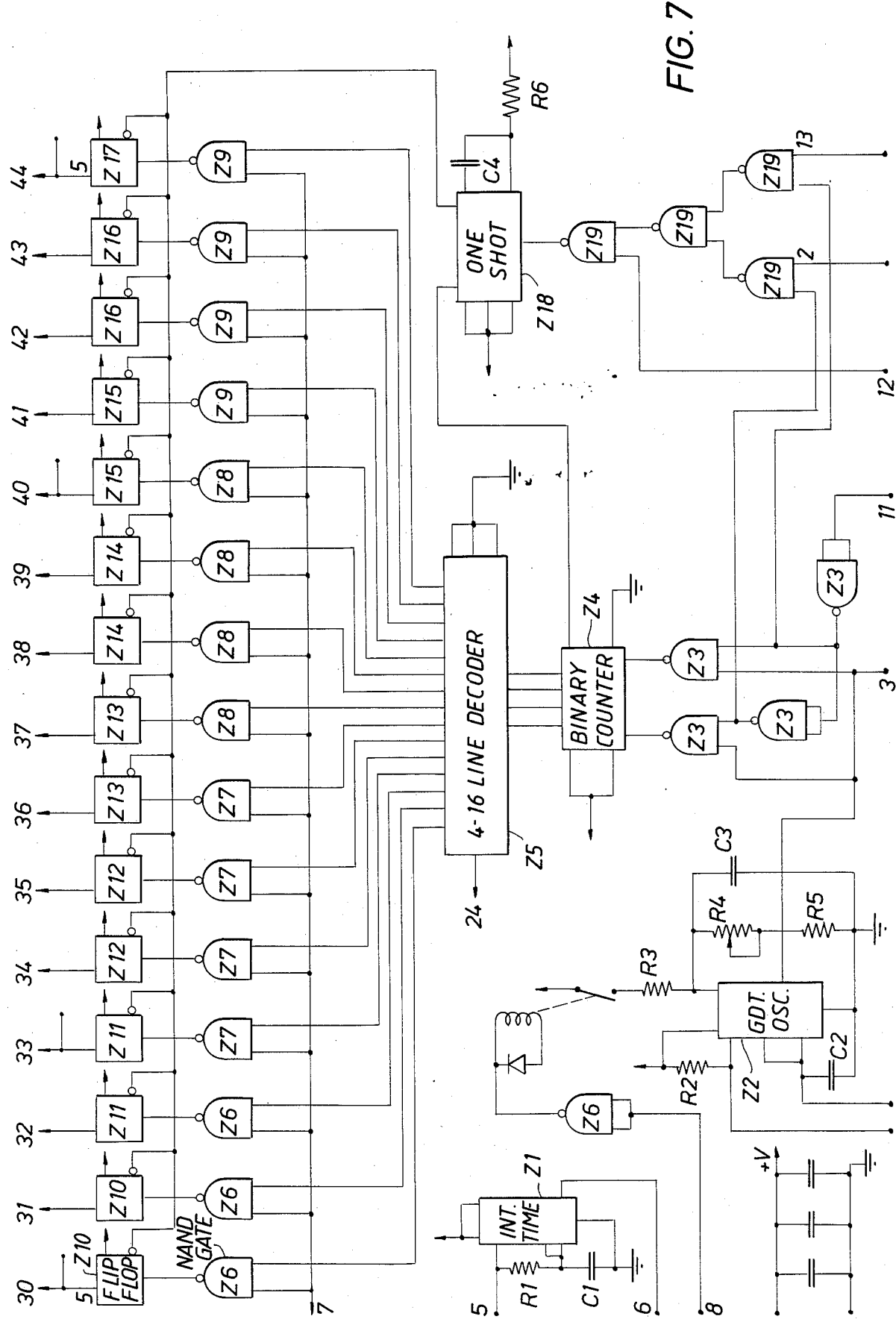
FIG. 7 is a detailed electronic schematic circuit for achieving power and control of the multilight highway warning light system of this invention.

Referring now to the drawings and first to FIG. 1, a portable warning light system constructed in accordance with the present invention is illustrated generally at 10 and incorporates a protective enclosure 12 in the form of a housing or storage case 12. The housing 12 defines a compartment 14 within which is located the electronic circuitry and the switching apparatus for the circuitry. A wall of the switching and circuiting compartment is defined by a control panel 16 which is also shown in FIG. 5.

The storage case 12 also forms a battery compartment 18 within which is located an appropriate rechargeable electrical storage battery. Typically, for efficient portability the storage battery will be of the nicad or gel cell type. If desired, the storage battery may take the form of a recombination electrolyte battery which utilizes recent battery technology that makes it quite different from other types of lead-acid batteries. This battery utilizes a recombination process which prevents the emission of gas under normal operating conditions. The electrolyte is held captive in an absorbent material and cannot spill or cause terminal corrosion. Water is never required. The charger input of this type of battery is polarity protected and current limited. The housing structure is provided with a skylight which enables visual inspection of the battery.

The housing structure also defines a light block receptacle which provides a storage chamber for a plurality of light blocks 24. One of the light blocks 26 forms a closure for one end of the housing structure in addition to serving in its capacity as a light block. As shown in greater detail in FIGS. 2 and 3, each of the light blocks shown generally at 24 defines a light support block or base which is weighted at its lower extremity 28 to provide for its adequate support on most surfaces. The light blocks each define a socket or electrical receptacle 30 at its inside end. The light block structure is sufficiently hollow as to define a compartment for electrical circuitry, which compartment is closed by an access panel 32. A Xenon strobe tube 34 is mounted at the upper portion 48 of the light block and is protected by means of a removable lens 36 composed of any suitable transparent polymer material of appropriate color. The light block forms a peripheral shoulder 38 against which the lower portion of the lens is seated. The lens is removable and may be replaced by a lens of any other suitable color for the particular condition involved. For example, if the portable strobe light system is to be utilized for outlining a landing site for EMS helicopters some of the lens may be clear or of amber color, while others may be of blue color, to thereby ensure that the wind direction can be visually observed by the helicopter pilot, the blue lens providing indication of wind direction.

The light block 24 is provided at its lower extremity with opposed horizontal slots 40 and 42, at least one of which receives a telescoping slide track assembly having one track component 44 secured to the light block 26 and another track component 46 with a portion thereof secured to the adjacent light block. The track assembly may incorporate more than two component parts if desired. Its purpose is to maintain mechanical interconnection between adjacent light blocks and to allow the light blocks to be extended from the storage case to form an elongated multilight assembly or array which can be put to any desired use as governed by the particular emergency condition that is involved. Although the track assembly is shown as a two-piece slide track, this should be born in mind that interconnection between adjacent light blocks may be established in any suitable manner. The means utilized for such interconnection may incorporate substantially rigid members such as the components of the track assembly or, in the alternative, may incorporate flexible members such as wires, cables, chains, etc. It is desirable only that the strobe light system be capable of collapsing to a sufficiently small dimension to be readily stored within a small protective case for portability and that it be capable of extension to form an elongated light block array with the light blocks being disposed in spaced relation with one another in the manner shown in FIG. 5. As mentioned above, folding fence structures may be employed to interconnect the light blocks. The fences will unfold to allow the light blocks to form a spaced light array.

As shown in FIG. 6, the power pack 50 is in the form of a rechargeable storage battery circuit having a rechargeable 12 volt battery of the nicad, gel cell or recombination electrolyte type. A recombination electrolyte battery that is suitable for this purpose is a 12 volt torque starter TS-650 battery manufactured by R. E. Technology and having a cold cranking amp rating of 650A. This particular battery for this intended use will have a reserve capacity of 85 minutes. Its size is 8.5 inches in length, 7.5 inches in height, and 7.0 inches in depth and weighs 35 pounds. This battery has a maximum charge current rating of 4 amps. As mentioned above, the electrolyte in this battery is held captive in an absorbent material and cannot spill or cause terminal corrosion. The power pack incorporates a battery charging circuit 54 that is polarity protected and current limited.

The control panel 16 is provided with a power on/off switch 56 which applies the 12 volt power of the power pack to a high voltage supply 58 and a 5 volt regulator 60. The control panel also includes a 3-position rotary switch 62 with associated resistors for controlling the flash interval. A 3-pole double throw toggle switch 64 is also provided on the control panel to permit the user to select the sequence or simultaneous flash circuits. A 3-position rotary switch 66 is provided together with the associated resistors therefor for controlling the sequence rate. A single pole double throw toggle switch 68 is provided to permit the user to select the sequence direction for right-to-left or left-to-right sweep energization of the strobe lights.

The high voltage power supply 58 includes a high voltage generator that will supply sufficient voltage and current to fire 15 Xenon flash tubes, each with sufficient light output for efficient visibility under highway conditions. The 5 volt regulator 60 is a solid state 7805 series regulator with associated filter capacitor to supply the power for the sequence and control logic.

The sequence and control circuit board 70 employs sequence and control circuits that use low power schottky TTL and monolithic timing intergrated circuits and require approximately 600 MA at 5 VDC. The circuitry can be broken down into five discrete parts, i.e. interval timer, gated oscillator, binary counter, 4 to 16 line decoder and the gating and reset circuits.

The interval timer Z1 is a NE 555 monolithic timer, which with the associated resistor R1 and capacitor C1, supplies a 5 millisecond pulse at intervals selected by the control panel switch 62. These intervals preferably are 0.5 seconds, 1 second and 1.5 seconds.

The gated oscillator circuit Z2 is a NE 555 oscillator circuit configured as a free running square wave oscillator. The frequency of the oscillator is determined by the resistors selected by the control panel and the 0.04 MF capacitor C2. The time that the oscillator runs is determined by the 10 MF capacitor C3, the 47 K resistor R5, and the 50 K potentiometer R4.

The binary counter Z4 is a SN74LS193 up/down counter. The input is selected by the sequence direction switch 64 on the control panel. This allows the counter to count up or count down the output of the gated oscillator 22.

The 4–16 line decoder 25 is a SN74154 integrated circuit which accepts the four outputs of the binary counter Z4 and decodes this to one output line. The output of the 4–16 line decoder Z5 controls the output of nand gates Z-6 through Z-9 which are SN74LS00 integrated circuits. The output of the nand gates is the clock input of flip-flop circuits Z-10 through Z-17 which are SN74LS74 integrated circuits. The Q output of the flip-flop circuits is the input to the the lamp module drivers. The output of flip flops Z10-5 and Z17-5 are also the inputs to nand gate Z19-2 and Z19-13 which are selected by the sequence direction switch 68. The output of the nand gates Z-19 is the clock input of Z-18, which is a SN74LS123 one shot. The outputs of the one shot are reset pulses for the binary counter Z4 and the flip-flop circuits Z10-Z17. The pulse width is sufficient to ensure the gated oscillator Z2 has timed out.

In the simultaneous mode, the gated oscillator Z2, the binary counter Z4 and the 4-16 line decoder are not used. The output of the interval timer is the controlling input to nand gates Z-6 through Z-9 and the reset input is also controlled by the interval timer.

The lamp module drivers are ZN2222 transistors configured as emitter followers and supplied by the plus 12V switch. They supply both voltage and current gain from the sequence and control card.

The trigger input to the lamp module 74 is a positive going pulse to the gate of each SCR enabling it to conduct and discharge capacitor C1. This results in a pulse across T1 primary resulting in a high voltage trigger pulse in the secondary thus firing the Xenon flash tube.

The electronic circuitry described above is intended only to be representative of an exemplary embodiment of this invention and should not be considered as limiting the scope hereof. It should be understood that other electronic circuitry for this purpose may be employed within the spirit and scope of this invention.

The present invention provides a sophisticated highway warning device that is safe, fast and reusable. This portable multilight strobe light system is compact and capable of being carried in the storage compartment of a typical vehicle. When an emergency condition arises, it is easily removed from the storage compartment of the vehicle and placed on the ground or on any supporting structure. The plurality of strobe light blocks are then extended from the housing or case and are deployed to form an elongated spaced multilight array in the order of 20 feet in length. The user will then energize the system by turning on the power switch and setting the appropriate switches of the control panel to achieve simultaneous flashing of the strobe lights or to achieve sweeping serial flashing of the strobe lights from right-to-left or from left-to-right. This sweeping serial light flashing is quite effective for directional control of traffic such as for directing traffic around an obstruction, accident scene, etc. The multilight strobe units may be of any suitable length for the particular purpose intended and may be effectively utilized by personnel involved in police, fire, emergency medical services and military activities. A smaller, less sophisticated, multilight system may be provided for private use such as when an automobile is disabled on the roadside for repairs. A unit may be attached to the rear of a wide load to alert following traffic and direct the vehicles around the oversized load.

While the foregoing is directed to the preferred embodiment of the present invention, other and further embodiments of the invention may be devised without departing from the basic scope thereof, and the scope thereof is determined by the claims which follow.

What is claimed is:

1. A portable multilight system comprising:
 (a) housing means forming a light block receptacle;
 (b) a plurality of light blocks each having light means thereon and being disposed in side-by-side relation within said light block receptacle in the stored condition thereof and being extended from said light block receptacle to form a spaced light block array when deployed for use;
 (c) circuit means electrically connecting said light means of said plurality of light blocks and being selectively controllable for simultaneous flashing of said light means or serial flashing of said light means from either end of said light block array to the opposite end thereof; and
 (d) power pack means providing a source of electrical energy for energization of said circuit means and said light means.

2. A portable multilight system as recited in claim 1, wherein said housing means also forms a power pack chamber, said power pack means being disposed within said power pack chamber.

3. A portable multilight system as recited in claim 1, wherein:
 (a) each of said light blocks forms an electrical receptacle;
 (b) said circuit means incorporates a plurality of spaced electrical connectors each being receivable respectively within one of said electrical receptacles of respective light blocks.

4. A portable multilight system as recited in claim 1, wherein said light means of each of said light blocks is formed by at least one Xenon strobe tube.

5. A portable multilight system as recited in claim 1, wherein:
 track means is interconnected to adjacent light blocks, said track means being telescopically movable permitting extension of said plurality of light blocks to form an interconnected, spaced light array.

6. A portable multilight system as recited in claim 1, wherein each of said light blocks comprises:
 (a) a body structure forming a chamber incorporating a portion of said circuit means and forming an electrical receptacle, said light means being disposed at the upper portion of said light block;
 (b) said circuit means having a plurality of electrical plugs each being received within one of said electrical receptacles of respective light blocks.

7. A portable multilight system as recited in claim 6, wherein the upper portion of each of said light blocks defines a reflective surface and a protective lens encloses said reflective surface and said light means, said protective lens being composed of transparent or translucent material of desired color.

8. A portable multilight system as recited in claim 6, wherein:
 (a) each of said light blocks forms track receptacle means; and
 (b) track means is receivable within said track receptacle means and includes a movable portion thereof interconnected with the adjacent light block thereby enabling light blocks to be extended to spaced relation to form said light array.

9. A portable multilight system as recited in claim 1, wherein said power pack means incorporates a rechargeable storage battery and a battery charging circuit that is polarity protected and current limited.

10. A portable multilight system as recited in claim 9, wherein said housing means forms a circuit control panel, said circuit control panel having:
 (a) an on/off switch for controlling energization of said circuit means;
 (b) a three position rotary switch for controlling the flash interval;
 (c) a three pole double throw toggle switch for selection of the sequence or simultaneous flash circuit;
 (d) a three position rotary switch for controlling the sequence rate; and
 (e) a single pole double throw toggle switch for selection of the sequence direction.

11. A portable multilight system as recited in claim 1 wherein said circuit means incorporates a sequence and control circuit including an interval timer, a gated oscillator, a binary counter, a 4–16 line decoder and gating and reset circuit means.

12. A portable multilight strobe light system comprising:
(a) housing means forming a power pack chamber and forming a light block receptacle;
(b) a plurality of light blocks, each having Xenon tube strobe light means thereon being disposed in side-by-side relation within said light block receptacle in the stored condition thereof and being extended from said light block receptacle to form a spaced light block array when deployed for use;
(c) track means securing said light blocks in assembly with one another and permitting said light blocks to be extended from said side-by-side relation endwise to a spaced relation thus causing said spaced light block array to be a number of feet in total length;
(d) electronic circuit means electrically connecting said Xenon tube strobe light means of said plurality of light blocks and being selectively controllable for simultaneous flashing of said Xenon tube strobe light means or serial flashing of said Xenon tube strobe light means from either end of said light block array to the opposite end thereof; and
(e) rechargeable power pack means providing a source of electrical energy for energization of said circuit means and said Xenon tube strobe light means.

13. A portable multilight system as recited in claim 12, wherein said housing means incorporates a control panel having multiple switches thereon for controlling energization of said circuit means, the flash interval of said Xenon tube strobe light means, the sequence or simultaneous flashing capability of said Xenon tube strobe light means, the sequence rate of Xenon tube strobe light flashing and the sequence direction of serial flashing of said Xenon tube light means.

14. A portable multilight system as recited in claim 13, wherein said power pack means comprises:
(a) a rechargeable storage battery of the recombination electrolyte type;
(b) a battery charging circuit coupled with said rechargeable storage battery and being polarity protected and current limited.

15. A portable multilight system as recited in claim 13, wherein:
(a) a selectively colored lens member is removably attached to the upper portion of each of said light blocks and forms a protective light penetrating cover for said Xenon tube strobe light means.

16. A portable multilight system as recited in claim 13, wherein said track means comprises:
(a) at least one track receptacle being formed in each of said light blocks;
(b) a first track element being located within said track receptacle and secured in immovable relation to one of said light blocks; and
(c) a second track element being disposed in telescoping relation with said first track element and being fixed to the adjacent one of said light blocks.

* * * * *